(12) United States Patent  
Ye et al.

(10) Patent No.: US 12,037,907 B2  
(45) Date of Patent: Jul. 16, 2024

(54) HYPERGRAVITY MODEL TEST DEVICE AND METHOD FOR SIMULATING PROGRESSIVE FAILURE OF SHIELD TUNNEL FACE

(71) Applicants: Zhejiang University, Hangzhou (CN); PowerChina Huadong Engineering Corporation Limited, Hangzhou (CN)

(72) Inventors: Xiaowei Ye, Hangzhou (CN); Zhixiong Liu, Hangzhou (CN); Siyuan Ma, Hangzhou (CN); Junchao Li, Hangzhou (CN); Yunmin Chen, Hangzhou (CN); Jing Hou, Hangzhou (CN); Weijiang Chu, Hangzhou (CN); Can Wang, Hangzhou (CN)

(73) Assignees: Zhejiang University, Hangzhou (CN); PowerChina Huadong Engineering Corporation Limited, Hangzhou (CN)

( * ) Notice: Subject to any disclaimer, the term of this patent is extended or adjusted under 35 U.S.C. 154(b) by 226 days.

(21) Appl. No.: 17/658,280

(22) Filed: Apr. 7, 2022

(65) Prior Publication Data
US 2022/0228486 A1  Jul. 21, 2022

(30) Foreign Application Priority Data
Dec. 27, 2021 (CN) .......................... 202111617926.1

(51) Int. Cl.
*E21D 9/00* (2006.01)
*E21D 9/06* (2006.01)
(Continued)

(52) U.S. Cl.
CPC ........... *E21D 9/003* (2013.01); *E21D 9/0635* (2013.01); *E21D 9/0879* (2016.01); *G01N 3/068* (2013.01);
(Continued)

(58) Field of Classification Search
CPC ..... E21D 9/003; E21D 9/0879; E21D 9/0635; E21D 9/00; G01N 33/24; G01N 3/068;
(Continued)

(56) References Cited

U.S. PATENT DOCUMENTS 9,989,671 B2    6/2018  Li et al.
2023/0288294 A1*   9/2023  Liang ........................ E21D 9/00

FOREIGN PATENT DOCUMENTS

CN   203287239    *  11/2013
CN   105021418 A     11/2015
(Continued)

*Primary Examiner* — Carib A Oquendo (57) ABSTRACT

A hypergravity model test device for simulating a progressive failure of a shield tunnel face, including a model box, a shield tunnel model, a servo loading control system and a data acquisition system. The servo loading control system includes a servo motor, a planetary roller screw electric cylinder and a loading rod. The data acquisition system includes a displacement transducer, an axial force meter, a pore pressure transducer, an earth pressure transducer and an industrial camera. The servo loading control system is connected to an excavation plate through the loading rod to control the excavation plate to move back and forth along an axial direction of the shield tunnel model at a set speed to simulate failure of the shield tunnel face. A method for simulating a progressive failure of a shield tunnel face is also provided.

8 Claims, 4 Drawing Sheets

(51) Int. Cl.
*E21D 9/08* (2006.01)
*G01N 3/06* (2006.01)
*G01N 3/12* (2006.01)
*G01V 3/17* (2006.01)

(52) U.S. Cl.
CPC ................. *G01N 3/12* (2013.01); *G01V 3/17* (2013.01); *G01N 2203/0075* (2013.01); *G01N 2203/0246* (2013.01); *G01N 2203/0647* (2013.01)

(58) Field of Classification Search
CPC ............. G01N 3/12; G01N 2203/0075; G01N 2203/0246; G01N 2203/0647; G01V 3/17
See application file for complete search history.

(56) References Cited

FOREIGN PATENT DOCUMENTS

| | | | |
|---|---|---|---|
| CN | 108072749 | * | 5/2018 |
| CN | 110068473 | * | 7/2019 |
| CN | 112816660 A | | 5/2021 |
| CN | 113720994 | * | 11/2021 |

* cited by examiner

HYPERGRAVITY MODEL TEST DEVICE AND METHOD FOR SIMULATING PROGRESSIVE FAILURE OF SHIELD TUNNEL FACE

CROSS-REFERENCE TO RELATED APPLICATIONS

This application claims the benefit of priority from Chinese Patent Application No. 202111617926.1, filed on Dec. 27, 2021. The content of the aforementioned application, including any intervening amendments thereto, is incorporated herein by reference in its entirety.

TECHNICAL FIELD

This application relates to tunnel engineering, and more particularly to a hypergravity model test device and method for simulating a progressive failure of a shield tunnel face.

BACKGROUND

Largely developing urban rail transit is an important way to get out of the dilemma between the increasing traffic congestion and the limited land space in big cities. Shield tunneling, with fast construction speed, high degree of mechanization and little impact on the surrounding environment, has been widely used in the construction of urban rail transit. During the excavation, a shield machine is capable of providing a support force through a soil tank or pressurized mud water to balance a soil-water pressure in front of a tunnel face, so as to reduce the disturbance of the shield tunneling to the surrounding strata. However, when the support pressure provided by the shield machine is less than or greater than the soil-water pressure in front of the tunnel face, the soil body in front of the tunnel face will suffer an active or passive failure, leading to settlement or uplift of the ground surface. Even worse, the failure of the tunnel face may occur and threaten the safety of the existing structures and buildings. Therefore, the determination of a reasonable limit support pressure is of great significance for maintaining the stability of the shield tunnel face and guiding the control of shield construction parameters, facilitating reducing the risk of failure of the shield tunnel face.

The failure of the shield tunnel face is a failure of the underground rock and soil, and thus cannot be observed and analyzed through field monitoring. Generally, the failure of the shield tunnel face is studied by means of an indoor model test. A small-scale physical modeling at 1 g cannot restore an in-situ stress of soil, and fails to accurately reveal a mechanical behavior of the soil in front of the shield tunnel face during the failure process. Whereas in a hypergravity model test, the model is placed on a geotechnical centrifuge that is rotating at a high speed, such that the model is subjected to a stress state similar to that of a prototype, and is capable of simulating the mechanical behavior of the prototype soil. Therefore, the hypergravity model test becomes the most common way to study the stability of the shield tunnel face.

Currently, the existing centrifuge test devices for studying the failure of the shield tunnel face mainly include two modes: a stress-controlled mode and a displacement-controlled mode. In the stress-controlled mode, a latex bag filled with compressed air or liquid is arranged in a shell to support the shield tunnel face, and the failure of the shield tunnel face is introduced through gradually reducing the pressure in the latex bag. In the displacement-controlled mode, a support pressure for the shield tunnel face is provided by connecting a rigid plate to a loading device, and the simulation of the failure of the shield tunnel face is achieved through moving the rigid plate back and forth. It should be noted that the in-situ stress of soil strata varies along depth; however, the support pressure provided by the pressured air is evenly distributed, such that the test accuracy of the stress-controlled mode is largely affected by the buried depth of the tunnel, especially for the deep buried tunnels. Although a liquid with the same weight as the foundation soil may be used to provide the shield tunnel face with a support pressure varies along the depth, it is hard to balance the vertical and lateral earth pressures of the stratum at the same time since the liquid is in a hydrostatic-pressure state. Therefore, devices based on the stress-controlled mode fail to accurately obtain a variation law of the support pressure during the failure of the shield tunnel face. Whereas devices based on the displacement-controlled mode are able to accurately reflect the change of the support pressure, and are more suitable for simulating the failure process of the shield face. A gap between the shell and the rigid plate in the devices based on the displacement-controlled mode is usually filled with a foam strip; however, it has been practically demonstrated that such sealing way is not effective, and a leakage of the shield tunnel face may occur, affecting the test accuracy. In addition, the sealing failure of the model box will also affect the simulation accuracy with regard to the failure of the shield tunnel face.

Furthermore, the surface settlement of the model in the existing test is monitored using a linear variable differential transformer (LVDT) displacement transducer or a laser displacement transducer, such that the settlement data is collected through limited monitoring points, and the key characteristics of the ground surface settlement is hard to obtain. In addition, the contact during the measurement may also disturb the development of the surface settlement. Therefore, the current experimental research mainly focuses on the failure mode of shield tunnel face and the variation law of support pressure, whereas the in-depth research about the influence of failure of the shield tunnel face on the surface settlement and the transfer mechanism of soil stress is insufficient.

SUMMARY

An object of the present disclosure is to provide a hypergravity model test device and method for simulating a progressive failure of a shield tunnel face to precisely control a movement of the rigid plate using a servo motor, optimize a seal of the rigid plate and monitor surface settlement of a model using a multi-view stereo vision technology, so as to accurately obtain characteristics and an influence range of the progressive failure of the shield tunnel face.

The technical solutions of the present disclosure are described as follows.

In a first aspect, the present disclosure provides a hypergravity model test device for simulating a progressive failure of a shield tunnel face, comprising:

a model box;
a shield tunnel model;
a servo loading control system; and
a data acquisition system;
wherein the shield tunnel model is arranged inside the model box; the servo loading control system is arranged outside the model box; the data acquisition system is distributed inside and outside the model box; the shield tunnel model is connected to an inner side wall of the model box through a bolt; the servo loading control system is connected to a rigid plate through a loading rod; a transducer of the data acquisition system is buried in the model box; the transducer is connected to an axial force meter; and the transducer of the data acquisition system is fixedly connected to the rigid plate.

In some embodiments, the model box comprises a rigid box body, a sealing plate and a camera mounting frame; the rigid box body comprises a front side plate, a middle bearing frame and a rear side plate that are connected through high-strength bolts; a stainless-steel layer is provided in the rigid box body; the front side plate of the rigid box body is made of high-strength transparent plexiglass configured for visual monitoring; other side plates of the rigid box body are made of aluminum alloy; a left side of the rigid box body is provided with a round hole; a left outer wall of the rigid box body is provided with a screw hole; the sealing plate is fixedly connected to a left side plate of the rigid box body through a bolt, so as to waterproof the model box; the camera mounting frame is fixedly provided on a top of the model box through a bolt; the camera mounting frame is provided with four longitudinal beams to fix an industrial camera array; and the industrial camera array is configured to measure a ground surface deformation during the progressive failure of the shield tunnel face.

In some embodiments, the shield tunnel model comprises a shield shell, the rigid plate and a support block; the shield shell is a semi-cylindrical shell; a tail part of the shield shell is provided with a connecting plate; the connecting plate is provided with an opening configured to allow the connecting plate to be connected to a side plate of the model box; the connecting plate is provided with a sealing ring; the rigid plate is of a semi-cylindrical shape; a middle of a side of the rigid plate towards soil is provided with a connecting screw hole and a groove; the connecting screw hole is configured to allow the rigid plate to be connected to the loading rod; and the groove is configured to accommodate a pore pressure transducer and an earth pressure transducer; a tail part of the rigid plate is provided with two transverse grooves; the two transverse grooves are provided with two O-shaped sealing rings; the support block is arranged at a bottom of the shield shell, and is configured to support the shield tunnel model; and a top of the support block matches the shield shell;

In some embodiments, the servo loading control system comprises a servo motor, a screw rod, a planetary roller, a nut and a driven shaft that are connected in sequence; the planetary roller is configured to convert a circular motion of the screw rod into a reciprocating linear motion of the nut; the nut is connected to the driven shaft, and is configured to drive the driven shaft to move linearly; the driven shaft is connected to the loading rod through the axial force meter, and is configured to transmit a linear motion to the loading rod to drive the rigid plate to move forward and backward; and the servo loading control system is configured to accurately control a low-speed motion of the rigid plate according to an excavation-panel displacement signal fed back by a linear variable differential transformer (LVDT) displacement transducer, and a simulation of an active failure or a passive failure of the shield tunnel face according to a forward motion or a backward motion of the loading rod.

In some embodiments, the data acquisition system comprises the LVDT displacement transducer, the axial force meter, the pore pressure transducer, the earth-pressure transducer and an industrial camera; the LVDT displacement transducer is fixedly connected to a lower part of the servo motor, and is configured to monitor a displacement of the rigid plate; two ends of the axial force meter are provided with threads; the axial force meter is threadedly connected to the driven shaft and the loading rod, and is arranged between the driven shaft and the loading rod; the axial force meter is configured to monitor a support pressure during a failure of the shield tunnel face; the groove of the rigid plate is provided with the pore pressure transducer and the earth pressure transducer; the pore pressure transducer and the earth pressure transducer are buried in soil in front of the shield tunnel face to monitor a pore water pressure and an earth pressure of the soil, respectively; the industrial camera array is fixedly connected to the camera mounting frame, and is configured to obtain an image of a three-dimensional deformation of soil at a surface of a soil body; an industrial camera is arranged in front of the model box, and is configured to obtain images of the failure of the shield tunnel face through the high-strength transparent plexiglass; and a two-dimensional deformation of the soil in front of the shield tunnel face is analyzed using a particle image velocimetry technology.

In some embodiments, the industrial camera is configured to monitor the three-dimensional deformation of the soil at the model surface based on a multi-view stereo vision principle, wherein a surface of a model soil is provided with mark points, and a calibration plate with equidistant marking points and a light-emitting diode (LED) light strip arranged on a sidewall of the model box for camera calibration and illumination compensation, respectively.

In some embodiments, the industrial camera is configured to monitor the two-dimensional deformation of the soil in front of the shield tunnel face, wherein equidistant reference points and control points are arranged on an inside of the high-strength transparent plexiglass, and a fine-sand mark point is marked on the surface of the soil body of a non-textured soil sample such as clay.

In some embodiments, each transducer and industrial camera are connected to a data acquisition module of a geotechnical centrifuge through a data transmission cable, and are controlled and analyzed by a host in a control room of the geotechnical centrifuge.

In a second aspect, the present disclosure provides a method for simulating a progressive failure of a shield tunnel face using the hypergravity model test device, comprising:

(1) determining a ratio of a cover depth to a diameter of the shield tunnel model and an acceleration scaling factor g; laying a layer of sand cushion and geotextile with a thickness of 30 mm on a bottom of the model box; and installing a drain pipe for promoting consolidation of a model soil;

(2) installing the shield tunnel model, the sealing plate and the servo loading control system; connecting the axial force meter, a driven shaft and the loading rod; installing two pore pressure transducers and two earth pressure transducers in a groove of the rigid plate followed by sealing with a structural adhesive; and connecting the loading rod to the rigid plate via a first bolt;

(3) in a set hypergravity environment, driving, by the servo loading control system, the rigid plate to move back and forth at a set speed and recording readings of the axial force meter; calculating an average value of the readings of the axial force meter; calibrating a friction force between the rigid plate and the shield shell; and obtaining an actual support pressure at the shield tunnel face through calculating a difference between the average value of the readings of the axial force meter and the friction force;

(4) according to the ratio of the cover depth to the diameter of the shield tunnel model, preparing the model soil with a specified height through soil pouring or consolidation in the model box; burying nine pore pressure transducers and six earth pressure transducers in the model soil; after the model soil is prepared, remove a front side plate of the model box to arrange a fine-sand mark point on a top surface of the model soil and a side surface of the model soil in contact with the front side plate; and re-installing the front side plate of the model box;

(5) pasting a light-emitting diode (LED) light strip on a sidewall of the model box; installing a calibration plate on a position of the model box close to the model soil; fastening four first industrial cameras on the camera mounting frame via a second bolt; and adjusting camera parameters including focal length and angle to finish camera calibration;

(6) feeding the model box into a basket of a centrifuge; installing a second industrial camera in front of the model box followed by camera calibration; fixing signal lines of the LVDT displacement transducer, the pore pressure transducer and the earth pressure transducer on the basket and a rotating arm of the centrifuge; and connecting the signal lines of each sensor the data acquisition system;

(7) carrying out a centrifuge test; increasing an acceleration of the centrifuge to the acceleration scaling factor g followed by operation at the acceleration scaling factor g for a period of time; controlling the loading rod to drive the rigid plate to travel at a set constant speed to allow the shield tunnel face to experience progressive failure; synchronously controlling the four first industrial cameras and the second industrial camera to continuously capture images of failure of the shield tunnel face; recording data of the LVDT displacement transducer, the pore pressure transducer and the earth pressure transducer; and when the rigid plate travels to a target position, stopping loading and reducing the acceleration of the centrifuge until the centrifuge is stopped; and (8) analyzing a deformation image of a side of the model soil and a deformation image of the surface of the model soil using a particle image velocimetry technology and a multi-view stereo vision technology, respectively; determining the mode of the progressive failure of the shield tunnel face and the development characteristic of a ground surface settlement according to changes in earth pressure and pore water pressure of soil in front of the shield tunnel face; and determining a limit support pressure according to a relationship between a displacement of the rigid plate and the actual support pressure at the shield tunnel face.

In some embodiments, in step (8), the deformation image of the top surface of the model soil is analyzed using the multi-view stereo vision technology through the following steps:

(a) installing the four first industrial cameras on a top of the model box; installing the calibration plate and the LED light strip on the sidewall of the model box; and calibrating an internal parameter and an external parameter of the four first industrial cameras using a Levenber-Marquard algorithm;

(b) preprocessing images captured by the four industrial cameras by point operation and neighborhood operation to improve a signal-to-noise ratio of the images; extracting feature points from mark points of the calibration plate using scale-invariant feature transform; determining a corresponding relationship of the same object point in the model box among the images; performing a stereo match on the feature points through belief propagation and dynamic programming; and establishing a corresponding relationship of the same soil particle among the images; and (c) obtaining a parallax depth coordinate of a point in the images according to corresponding coordinates of the point in the images and a camera parameter matrix; and optimizing a parallax depth map of the point using a deep learning algorithm to reconstruct a spatial coordinate of each pixel in the images, so as to obtain a three-dimensional deformation field of the top surface of the model soil.

The beneficial effects of the present disclosure are described as follows.

(1) The hypergravity model test device provided herein optimizes waterproofing of a rigid plate and a model box to prevent the pore water pressure of the soil in front of the shield tunnel face from being affected by a leakage problem, and largely improves the accuracy of simulating failure of the shield tunnel face, especially for soft clay strata.

(2) A planetary roller screw electric cylinder is used herein. Compared with a hydraulic servo drive device, it can precisely control a low-speed and uniform motion of a rigid plate and effectively improve the stability of a test for simulating a progressive failure of the shield tunnel face.

(3) A three-dimensional deformation of soil at a surface of a model soil is monitored using a multi-view stereo vision technology, which has high precision, small interference and a wide measurement range, and overcomes the shortcomings of contact measurement such as using a traditional LVDT displacement transducer, such that a non-contact monitoring of the three-dimensional deformation of the soil at the model surface during the failure process of the shield tunnel face is achieved, promoting revealing an influence mechanism of the shield tunnel face failure on the ground surface settlement.

(4) The hypergravity model test device has convenient disassembly and assembly, and facilitates the failure simulation of the shield tunnel face under various working conditions such as different strata and different depths, so as to obtain the progressive failure law of the shield tunnel face and provide an experimental basis and reference for the design of the support pressure in the engineering practice.

In the drawings, 1, rigid box body; 2, sealing plate; 3, camera mounting frame; 4, shield shell; 5, rigid plate; 5-1, O-shaped sealing ring; 5-2, groove; 5-3, connecting screw hole; 6, support block; 7, servo motor; 8, screw rod; 9, planetary roller; 10, nut; 11, driven shaft; 12, cylinder body; 13, loading rod; 14, base; 15, LVDT displacement transducer; 16, axial force meter; 17, pore pressure transducer;

18, earth pressure transducer; 19, industrial camera array; 20, special bracket; 21, LED light strip; 22, calibration plate; and 23, industrial camera.

DETAILED DESCRIPTION OF EMBODIMENTS

The present disclosure will be further described below in detail with reference to the accompanying drawings and embodiments.

Embodiment 1

Figure 1:
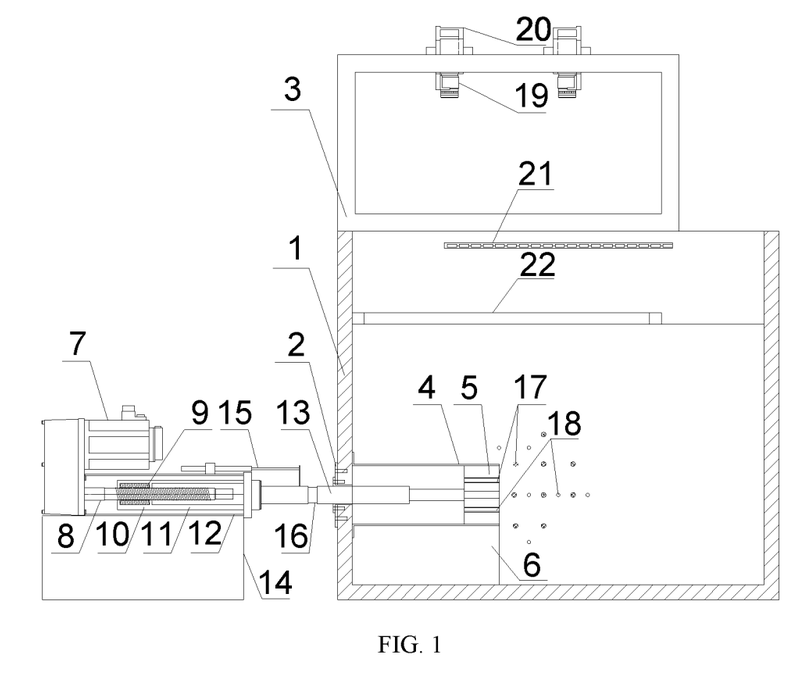
FIG. 1 is a front view of a hypergravity model test device for simulating a progressive failure of a shield tunnel face according to an embodiment of the present disclosure.
Figure 2:
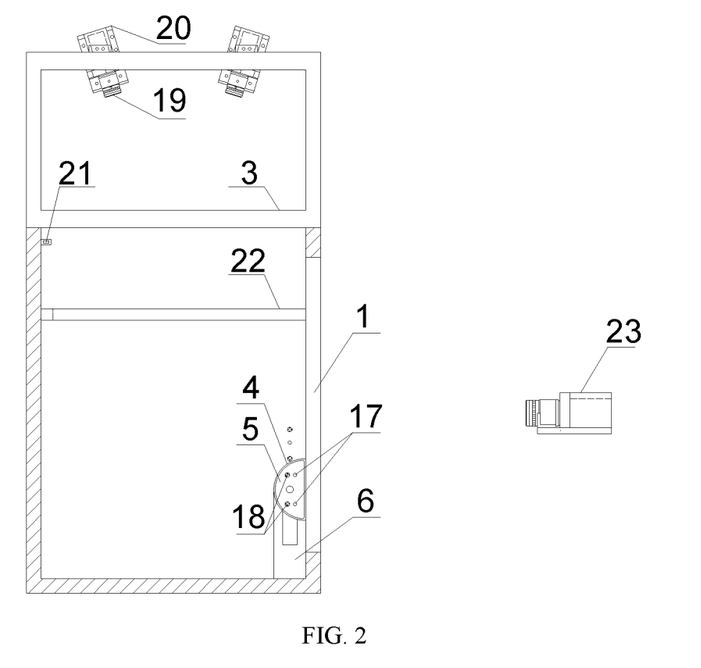
FIG. 2 is a side view of the hypergravity model test device according to an embodiment of the present disclosure.
Figure 3:
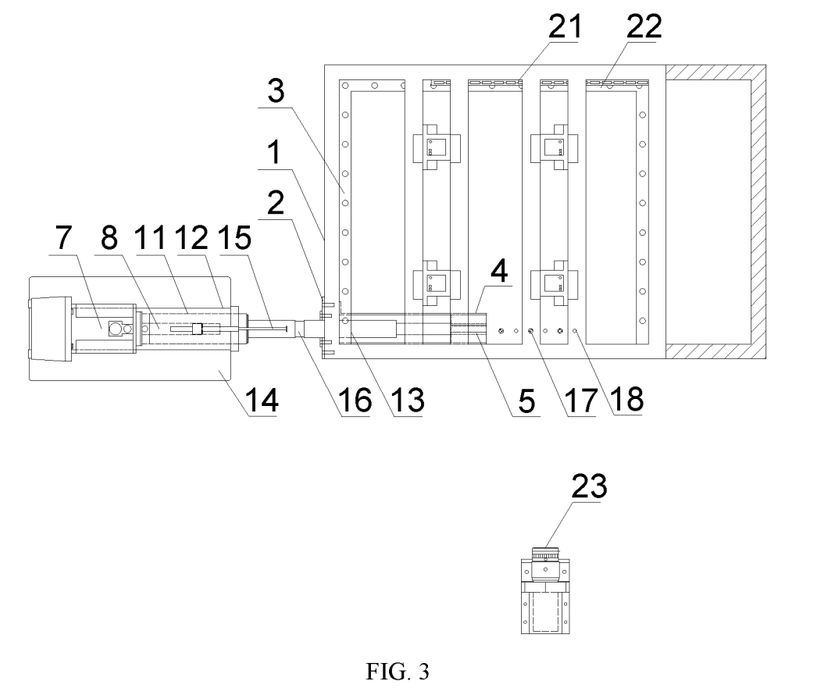
FIG. 3 is a top view of the hypergravity model test device according to an embodiment of the present disclosure.

As shown in FIGS. 1-3, 1. a hypergravity model test device for simulating a progressive failure of a shield tunnel face includes a model box, a shield tunnel model, a servo loading control system and a data acquisition system. The shield tunnel model is arranged inside the model box. The servo loading control system is arranged outside the model box. The data monitoring system is configured to monitor a key physical quantity including a displacement of the shield tunnel face, a support pressure, a pore water pressure and an earth pressure of soil in front of the shield tunnel face, a three-dimension deformation of soil at a surface of a soil body and a movement of subsurface soil in front of the shield tunnel face.

The model box includes a rigid box body 1, a sealing plate 2 and a camera mounting frame 3. The rigid box is mainly made of aluminum alloy. In order to better observe failure process of the shield tunnel face, a front side plate of the model box is made of high-strength transparent plexiglass, such that an industrial camera 23 in front of the model box is capable of capturing a failure image. A round hole is arranged on a left side of the rigid box body 1. A loading rod 13 passing through the round hole is threadedly connected to a rigid plate 5. In terms of the waterproof treatment of the model box, the sealing plate 2 is provided with an O-shaped sealing ring. The O-shaped sealing ring is fixed in a middle of a rectangular plate by a bolt and is fastened to the left side of the rigid box body 1. The camera mounting frame 3 is provided with four longitudinal beams. The four longitudinal beams are provided with a screw hole for fixing four industrial cameras. A base of the camera mounting frame 3 is fixed on a top of the model box by a bolt.

Figure 4:
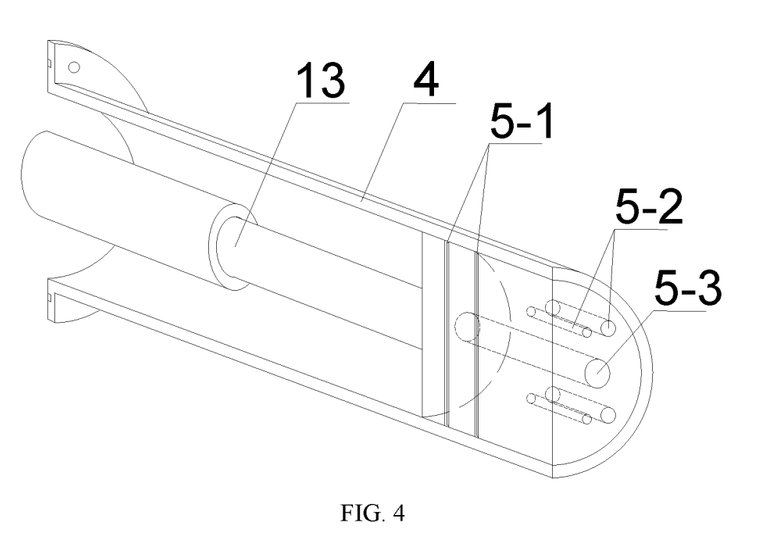
FIG. 4 schematically depicts a shield tunnel model according to an embodiment of the present disclosure.

The shield tunnel model includes a shield shell 4, a rigid plate 5 and a support block 6. The shield shell 4 is a semi-cylindrical shell. A tail part of the shield shell 4 is provided with a connecting plate. The connecting plate is provided with a screw hole, and is configured to be connected to a left side plate of the model box. As shown in FIG. 4, the rigid plate 5 is arranged at an inner right side of the shield shell 4, two 0-shaped sealing rings 5-1 are arranged in a middle of the rigid plate 5 to waterproof the rigid plate 5. A side of the rigid plate 5 towards soil is provided with a connecting screw hole 5-3 and a groove 5-2. The rigid plate 5 is connected with the loading rod 13 through the connecting screw hole 5-3. The groove 5-2 is configured to accommodate a pore pressure transducer 17 and an earth pressure transducer 18 to monitor the pore water pressure and the earth pressure of the soil in front of the shield tunnel face. The support block 6 is arranged at a bottom of the shield shell 4 to support the model shield tunnel.

The servo loading control system includes a servo motor 7, a planetary roller screw electric cylinder and the loading rod 13. The planetary roller screw electric cylinder includes a cylinder body 12, a screw rod 8, a planetary roller 9, a nut 10 and a driven shaft 11. The screw rod 8, the planetary roller 9, the nut 10 and the driven shaft 11 are connected in sequence. The planetary roller 9 is configured to convert a circular motion of the screw rod into a reciprocating linear motion of the nut 10, and transmit the reciprocating linear motion to the driven shaft 11 and the loading rod 13, such that the rigid plate 5 is capable of moving forward and backward along an axial direction of the shield tunnel model. The failure of a shield tunnel face is simulated as a displacement control mode, that is, a linear variable differential transformer (LVDT) displacement transducer 15 is configured to obtain a displacement signal of the rigid plate 5 to accurately control a motion of the rigid plate and set a travel threshold. The rigid plate 5 is controlled to move forward to simulate a passive failure of the shield tunnel face, and move backward to simulate an active failure of the shield tunnel face.

In order to accurately evaluate characteristics of the progressive failure of the shield tunnel face and a range of ground surface settlement, the data acquisition system includes the LVDT displacement transducer 15, an axial force meter 16, the pore pressure transducer 17, the earth pressure transducer 18, an industrial camera array 19 and the industrial camera 23.

The LVDT displacement transducer 15 is arranged at a lower part of the servo motor 7. A measuring head of the LVDT displacement transducer 15 is fastened by a nut to an iron sheet at an upper part of the loading rod 13 to monitor a displacement of the rigid plate 5. The axial force meter 16 is threadedly arranged between the driven shaft 11 and the loading rod 13, and is configured to monitor a support pressure of the shield tunnel face. Two pore pressure transducers 17 and two earth pressure transducers 18 are arranged on the rigid plate 5.

Nine pore pressure transducers 17 and six earth pressure transducers 18 are buried spaced apart along a longitudinal direction and a transverse direction in the soil body in front of the shield tunnel face to monitor a change of the pore water pressure and the earth pressure of the soil body.

The industrial camera array 19 is composed of four industrial cameras. The industrial camera array 19 is fixed on the camera mounting frame 3 by a special bracket 20, and is arranged on a top of the rigid box body 1. The industrial camera 23 is arranged in front of the rigid box body 1. Preferably, a calibration plate 22 (with equidistant mark points) is arranged on a wall of the model box and a LED light strip 21 is pasted on the wall of the model box for camera calibration and illumination compensation. For non-textured soil samples such as clay, it is also necessary to mark a fine-sand mark point on a surface of the soil body.

During the failure process of the shield tunnel face, a soil deformation process is continuously photographed by synchronously controlling industrial cameras, and a three-dimensional deformation field of soil at the surface of the soil body and a two-dimensional deformation field of the soil in front of the shield tunnel face are extracted using a multi-view stereo vision technology and a particle image velocimetry technology, respectively.

The various transducers and industrial cameras mentioned above are connected to a data acquisition module of a geotechnical centrifuge through a data transmission cable, and are controlled and analyzed by a host in a control room.

A hypergravity model test method for simulating a progressive failure of a shield tunnel face is performed as follows.

(1) A ratio of a cover depth to a diameter of the shield tunnel model and an acceleration scaling factor g are determined. A layer of sand cushion and geotextile with a thickness of 30 mm is laid on a bottom of the model box. A drain pipe is installed to promote consolidation of a model soil.

(2) The shield tunnel model, the sealing plate and the servo loading control system are installed. The axial force meter, the driven shaft and the loading rod are connected. Two pore pressure transducers and two earth pressure transducers are arranged in the groove of the rigid plate, and are sealed with a structural adhesive. The loading rod is then connected to the rigid plate via a bolt.

(3) In a set hypergravity environment, the rigid plate is driven by the servo loading control system to move back and forth at a set speed, during which readings of the axial force meter are recorded and an average value of the readings of the axial force meter is calculated; and a friction force between the rigid plate and the shield shell is calibrated. An actual support pressure at a shield tunnel face is equal to a difference between the average value of the readings of the axial force meter and the friction force.

(4) According to the ratio of the cover depth to the diameter of the shield tunnel model, the model soil with a specified height is prepared through soil pouring or consolidation in the model box, and nine pore pressure transducers and six earth pressure transducers are buried in the model soil. After the model soil is prepared, the front side plate of the model box is removed to mark a fine-sand mark on the top surface of the model soil and a side surface of the model soil in contact with the front side plate. The front side plate of the model box is then re-installed to the model box.

(5) The LED light strip is pasted on a sidewall of the model box, and the calibration plate is arranged on a position of the model box close to the model soil. The four industrial cameras are fastened on the camera mounting frame via a bolt. Camera parameters including focal length and angle are adjusted to complete the camera calibration.

(6) The model box is fed into a basket of a centrifuge, and the industrial camera is arranged in front of the model box followed by camera calibration. Signal lines of the LVDT displacement transducer, the pore pressure transducer and the earth pressure transducer are fixed on the basket and a rotating arm of the centrifuge, and connected to the data acquisition system.

(7) A centrifuge test is carried out. Specifically, an acceleration of the centrifuge is increased to the acceleration scaling factor g followed by operation at the acceleration scaling factor g for a period of time. The loading rod is controlled to drive the rigid plate to travel at a set constant speed to allow the shield tunnel face to experience progressive failure. At the same time, the four industrial cameras and the industrial camera continuously capture images of failure of the shield tunnel face. Data of the LVDT displacement transducer, the pore pressure transducer and the earth pressure transducer is recorded. When the rigid plate travels to a target position, loading is stopped and then the acceleration of the centrifuge is reduced until the centrifuge is stopped.

(8) Deformation images of a side of the model soil and deformation images of the surface of the model soil are analyzed using a particle image velocimetry technology and a multi-view stereo vision technology, respectively to determine a failure mode of the shield tunnel surface and a development characteristic of a ground surface settlement according to changes in earth pressure and pore water pressure of soil in front of the shield tunnel face. A limit support pressure is determined according to a relationship between a displacement of the rigid plate and the actual support pressure.

In an actual test, in step (8), the deformation image of the top surface of the model soil is analyzed using the multi-view stereo vision technology through the following steps.

(a) The four industrial cameras are arranged on a top of the model box. The calibration plate and the LED light strip are arranged on the side wall of the model box. An internal parameter and an external parameter of the four industrial cameras are calibrated using a Levenber-Marquard algorithm.

(b) The images captured by the four industrial cameras are preprocessed using point operation and neighborhood operation to improve a signal-to-noise ratio of the images. Feature points are extracted from mark points of the calibration plate using scale-invariant feature transform, and a corresponding relationship of the same object point in the model box among the images is determined. The feature points are subjected to a stereo match through belief propagation and a dynamic programming approach to establish a corresponding relationship of the same soil particle among the images.

(c) According to corresponding coordinates of a point in the images and a camera parameter matrix, a parallax depth coordinate of the point in the images are obtained. A parallax depth map of the point is optimized using a deep learning algorithm to reconstruct a spatial coordinate of each pixel in the images, so as to obtain a three-dimensional deformation field of the top surface of the model soil.

The embodiments provided herein are merely illustrative of the present disclosure, and not intended to limit the scope of this disclosure. It should be understood that modifications and replacements made by those skilled in the art without departing from the spirit of the present disclosure should fall within the scope of the present disclosure defined by the appended claims.

What is claimed is:

1. A hypergravity model test device for simulating a progressive failure of a shield tunnel face, comprising:
a model box;
a shield tunnel model;
a servo loading control system; and
a data acquisition system;
wherein the shield tunnel model is arranged inside the model box; the servo loading control system is arranged outside the model box; the data acquisition system is distributed inside and outside the model box; the model box comprises a rigid box body, a sealing plate and a camera mounting frame; the shield tunnel model comprises a shield shell, a rigid plate and a support block; the servo loading control system comprises a servo motor, a planetary roller screw electric cylinder, a loading rod and a base; and the data acquisition system comprises a linear variable differential transformer (LVDT) displacement transducer, an axial force meter, a pore pressure transducer, an earth pressure transducer and an industrial camera; and
the shield shell is a semi-cylindrical shell; a tail part of the shield shell is provided with a connecting plate; the connecting plate is provided with an opening configured to allow connection of the connecting plate to a side of the model box; the rigid plate is arranged at a side inside the shield shell; two O-shaped sealing rings are arranged at a tail part of the rigid plate, so as to waterproof the shield tunnel face; a side of the rigid plate towards soil is provided with a connecting screw hole and a groove; the connecting screw hole is configured to allow the rigid plate to be connected to the loading rod; and the groove is configured to accommodate the pore pressure transducer and the earth pressure transducer.

2. The hypergravity model test device of claim 1, wherein a front side plate of the model box is made of transparent plexiglass to observe the progressive failure of the shield tunnel face; and a side of the model box is provided with a round hole configured to install the sealing plate and allow the loading rod to pass through.

3. The hypergravity model test device of claim 2, wherein the camera mounting frame is fixedly provided on a top of the model box through a screw hole; and the camera mounting frame is provided with four longitudinal beams to fix the industrial camera.

4. The hypergravity model test device of claim 1, wherein the planetary roller screw electric cylinder comprises a cylinder body, a screw rod, a planetary roller, a nut and a driven shaft; the screw rod, the planetary roller, the nut and the driven shaft are connected in sequence; and the planetary roller is configured to convert a circular motion of the screw rod into a linear motion of the nut and the driven shaft and transmit the linear motion to the loading rod, so as to allow the rigid plate to move forward and backward along an axial direction of a tunnel.

5. The hypergravity model test device of claim 4, wherein the LVDT displacement transducer is configured to obtain a displacement of the rigid plate, so as to accurately control a motion of the rigid plate; and the rigid plate is controlled to move forward to simulate a passive failure of the shield tunnel face, and move backward to simulate an active failure of the shield tunnel face.

6. The hypergravity model test device of claim 1, wherein the industrial camera comprises four first industrial cameras and a second industrial camera; the four first industrial cameras are arranged on a top of the model box, and are arranged on the camera mounting frame through a special bracket; the four first industrial cameras are configured to obtain images of a deformation of a surface of a soil body during the progressive failure; the second industrial camera is arranged in front of the model box, and is configured to obtain deformation images of soil in front of the shield tunnel face; a calibration plate is arranged on a wall of the model box for camera calibration; and a light-emitting diode (LED) light strip is pasted on the wall of the model box for illumination compensation.

7. A method for simulating a progressive failure of a shield tunnel face using the hypergravity model test device of claim 1, comprising:
(1) determining a ratio of a cover depth to a diameter of the shield tunnel model and an acceleration scaling factor g; laying a layer of sand cushion and geotextile with a thickness of 30 mm on a bottom of the model box; and installing a drain pipe for promoting consolidation of a model soil;
(2) installing the shield tunnel model, the sealing plate and the servo loading control system; connecting the axial force meter, a driven shaft and the loading rod; installing two pore pressure transducers and two earth pressure transducers in a groove of the rigid plate followed by sealing with a structural adhesive; and connecting the loading rod to the rigid plate via a first bolt;
(3) in a set hypergravity environment, driving, by the servo loading control system, the rigid plate to move back and forth at a set speed, and recording readings of the axial force meter; calculating an average value of the readings of the axial force meter; calibrating a friction force between the rigid plate and the shield shell; and obtaining an actual support pressure at the shield tunnel face through calculating a difference between the average value of the readings of the axial force meter and the friction force;
(4) according to the ratio of the cover depth to the diameter of the shield tunnel model, preparing the model soil with a specified height through soil pouring or consolidation in the model box; burying nine pore pressure transducers and six earth pressure transducers in the model soil; after the model soil is prepared, removing a front side plate of the model box to arrange a fine-sand mark point on a top surface of the model soil and a side surface of the model soil in contact with the front side plate; and re-installing the front side plate of the model box;
(5) pasting a light-emitting diode (LED) light strip on a side wall of the model box; installing a calibration plate on a position of the model box close to the model soil; fastening four first industrial cameras on the camera mounting frame via a second bolt; and adjusting camera parameters including focal length and angle to finish camera calibration;
(6) feeding the model box into a basket of a centrifuge; installing a second industrial camera in front of the model box followed by camera calibration; fixing signal lines of the LVDT displacement transducer, the pore pressure transducer and the earth pressure transducer on the basket and a rotating arm of the centrifuge; and connecting the signal lines of each transducer to the data acquisition system;
(7) carrying out a centrifuge test; increasing an acceleration of the centrifuge to the acceleration scaling factor g followed by operation at the acceleration scaling factor g for a period of time; controlling the loading rod to drive the rigid plate to travel at a set constant speed to allow the shield tunnel face to experience progressive failure; synchronously controlling the four first industrial cameras and the second industrial camera to continuously capture images of failure of the shield tunnel face; recording data of the LVDT displacement transducer, the pore pressure transducer and the earth pressure transducer; and when the rigid plate travels to a target position, stopping loading and reducing the acceleration of the centrifuge until the centrifuge is stopped; and
(8) analyzing a deformation image of a side of the model soil and a deformation image of the top surface of the model soil using a particle image velocimetry technology and a multi-view stereo vision technology, respectively; determining a mode of the progressive failure of the shield tunnel face and a development characteristic of a ground surface settlement according to changes in earth pressure and pore water pressure of soil in front of the shield tunnel face; and determining a limit support pressure according to a relationship between a displacement of the rigid plate and the actual support pressure at the shield tunnel face.

8. The method of claim 7, wherein in step (8), the deformation image of the surface of the model soil is analyzed using the multi-view stereo vision technology through the following steps:
(a) installing the four first industrial cameras on a top of the model box; installing the calibration plate and the LED light strip on the side wall of the model box; and calibrating an internal parameter and an external parameter of the four first industrial cameras using a Levenber-Marquard algorithm;

(b) preprocessing images captured by the four first industrial cameras by point operation and neighborhood operation to improve a signal-to-noise ratio of the images; extracting feature points from mark points of the calibration plate using scale-invariant feature transform; determining a corresponding relationship of the same object point in the model box among the images; performing a stereo match on the feature points through belief propagation and dynamic programming; and establishing a corresponding relationship of the same soil particle among the images; and (c) obtaining a parallax depth coordinate of a point in the images according to corresponding coordinates of the point in the images and a camera parameter matrix; and optimizing a parallax depth map of the point using a deep learning algorithm to reconstruct a spatial coordinate of each pixel in the images, so as to obtain a three-dimensional deformation field of the top surface of the model soil.

* * * * *